INVENTORS
GEORGE STRAM
ALEXANDER A. McINTYRE
DONALD L. GEISELMAN
BY Otto Maeller July 10, 1962  G. STRAM ETAL  3,043,434
FILTRATION APPARATUS
Filed Oct. 15, 1958  6 Sheets-Sheet 2

INVENTORS
GEORGE STRAM
ALEXANDER A. McINTYRE
DONALD L. GEISELMAN
BY Otto Moeller

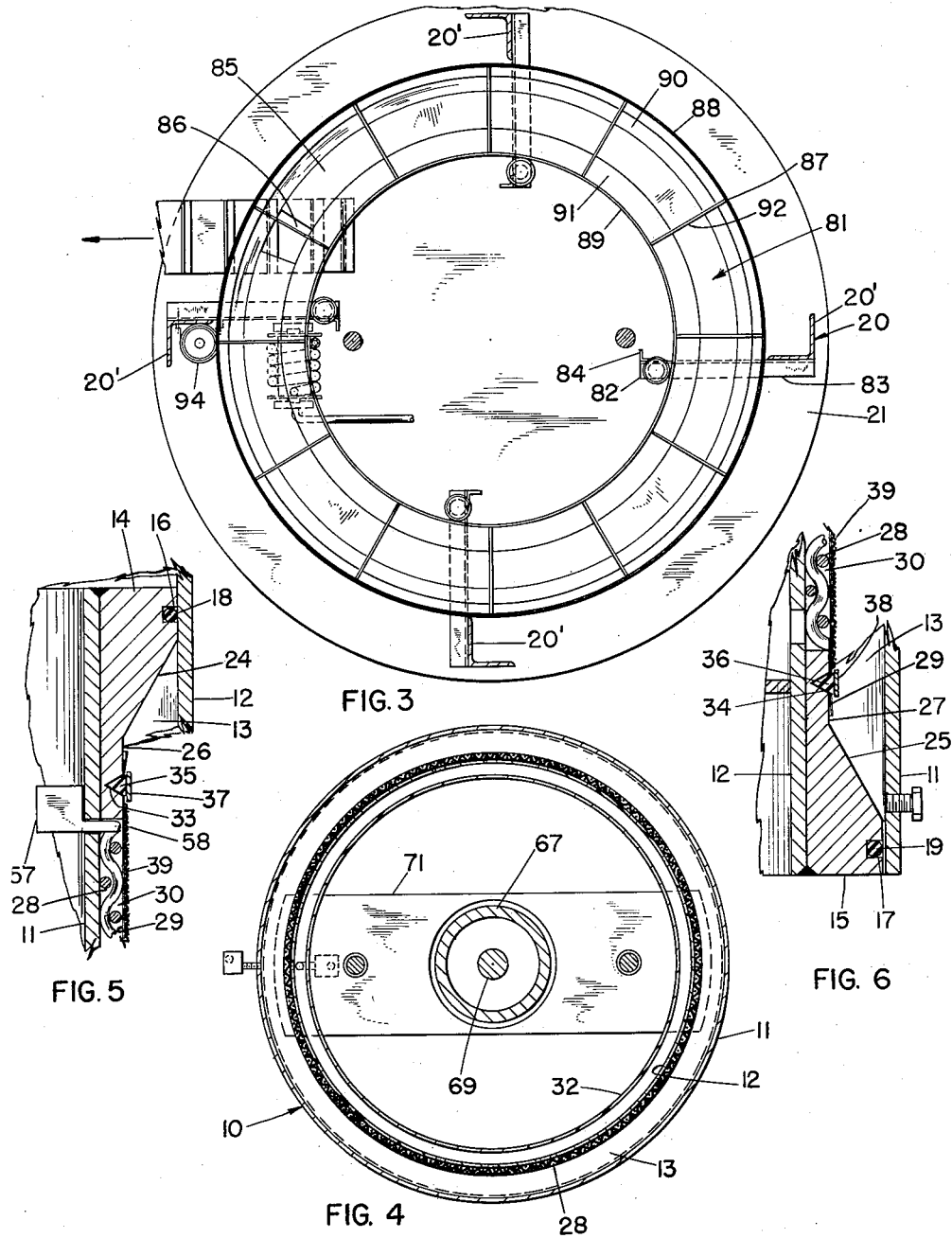

INVENTORS
GEORGE STRAM
ALEXANDER A. McINTYRE
DONALD L. GEISELMAN
BY Otto Moeller July 10, 1962 G. STRAM ETAL 3,043,434
FILTRATION APPARATUS
Filed Oct. 15, 1958 6 Sheets-Sheet 5

INVENTORS
GEORGE STRAM
ALEXANDER A. McINTYRE
DONALD L. GEISELMAN
BY *Otto Moeller*

INVENTORS
GEORGE STRAM
ALEXANDER A. McINTYRE
DONALD L. GEISELMAN
BY *Otto Moeller*

United States Patent Office 3,043,434
Patented July 10, 1962

3,043,434
FILTRATION APPARATUS
George Stram, Hellam, Alexander A. McIntyre, Lancaster, and Donald L. Geiselman, York, Pa., assignors to Capitol Products Corporation, a corporation of Pennsylvania
Filed Oct. 15, 1958, Ser. No. 767,362
15 Claims. (Cl. 210—236)

This invention relates to filtration apparatus designed to separate the liquid from the solid constituents of a dispersion of fine solids in a liquid, and more particularly to improvements in that type of filtration apparatus wherein the slurry to be filtered is forced through the filter medium under pressure, or a combination of pressure and vacuum on opposite sides of the filter medium.

In such apparatus it is customary to arrange the slurry chamber and the filter assembly for relative movement to enclose and expose the filter assembly; whereby, at the conclusion of a filtering cycle, the slurry may be drained from the chamber and then the filter assembly may be exposed for removal of the cake. The filtering effect of a filter medium diminishes rapidly as the time interval from the beginning of the filtration period increases, so that a high rate of filtration at the beginning of the filtration period rapidly diminishes as solids accumulate on the filter medium. It is, therefore, highly inefficient to continue filtration after the filter medium has reached a pre-determined degree of saturation. Depending on the nature of the material being filtered the optimum filtering period may be as short as thirty seconds or even less. Thus, after each such filtering cycle, the slurry is drained out of the slurry chamber away from the face of the filter medium whereupon the filter assembly may be exposed to remove the deposited cake. It is apparent then, that the time required to drain the slurry and to manipulate the apparatus to expose the filter assembly for the purpose of removing the cake, and thereafter refilling the slurry chamber for a succeeding filtering cycle constitutes a considerable part of the total time for a complete filtering cycle, even where the optimum filtering period may be considerably greater than thirty seconds. The aggregate down time of the apparatus thus becomes an important factor, particularly when filtering is carried out in short cycles.

Accordingly it is an object of this invention to provide an improved filtering apparatus of the type wherein the filter assembly and the slurry chamber are relatively movable, to enclose and expose the filter assembly with a minimum down time of the apparatus between filtering operations, thereby minimizing operational time and effecting production economy.

Another object is to provide a novel filtering apparatus of the type described above, constructed to provide a slurry chamber adapted to accommodate a filter medium having a large filtering surface area while maintaining the volume of the slurry chamber at a minimum, whereby the slurry chamber may be rapidly drained and refilled to minimize down time between filtering cycles.

Another object is to provide a novel and practical filtering apparatus, which includes spaced inner and outer cylindrical concentric vertically extending shells, the inner shell having at each end an annular head slidably engageable with the inner surface of the outer cylindrical shell, the inner and outer shells together with the heads forming a pressure tight annular slurry chamber. An annular filter unit is supported in surrounding engagement with the inner shell between its annular head members and is arranged to provide channels through which the filtrate flows downwardly to a communicating annular filtrate manifold which is secured to the inner surface of the lower end portion of the inner shell. The inner shell together with its heads, filter unit and manifold, and the outer shell are arranged for relative axial movement whereby to expose the filter unit for removal of the deposited cake therefrom, with one shell being fixed and the other vertically movable. A feature of this construction is that it makes provision for a space within the shells for accommodation of motive means for operating the movable shell.

Another feature of the construction just set forth is that it makes provision for introduction of air under pressure through a plurality of openings in the inner shell to the back of the filter medium over a widely distributed area, to facilitate loosening and removal of the cake from the entire area of the filter medium.

Another object is to provide filtering apparatus of the type described incorporating cake collecting and removal means of a novel and improved construction.

Further objects of the invention are to provide a novel and improved filtering apparatus which is practical and serviceable, simple and economical to install, maintain and operate; convenient and efficient in use, and which occupies a comparatively small space while productive of a comparatively large capacity result.

The foregoing objects and advantages of the present invention, together with various other objects and advantages thereof which will become apparent, may be attained with the exemplary embodiments of the invention which are described in detail hereinafter and which are illustrated in the accompanying drawings. Referring to the drawings:

FIGURE 3 is a sectional view taken on line 3—3 of FIGURE 2;

FIGURE 4 is a sectional view taken on line 4—4 of FIGURE 2;

FIGURE 5 is an enlarged fragmentary sectional view of the upper end of the filter element and associated parts;

FIGURE 6 is an enlarged fragmentary sectional view of the lower end of the filter element and associated parts;

Figure 1:
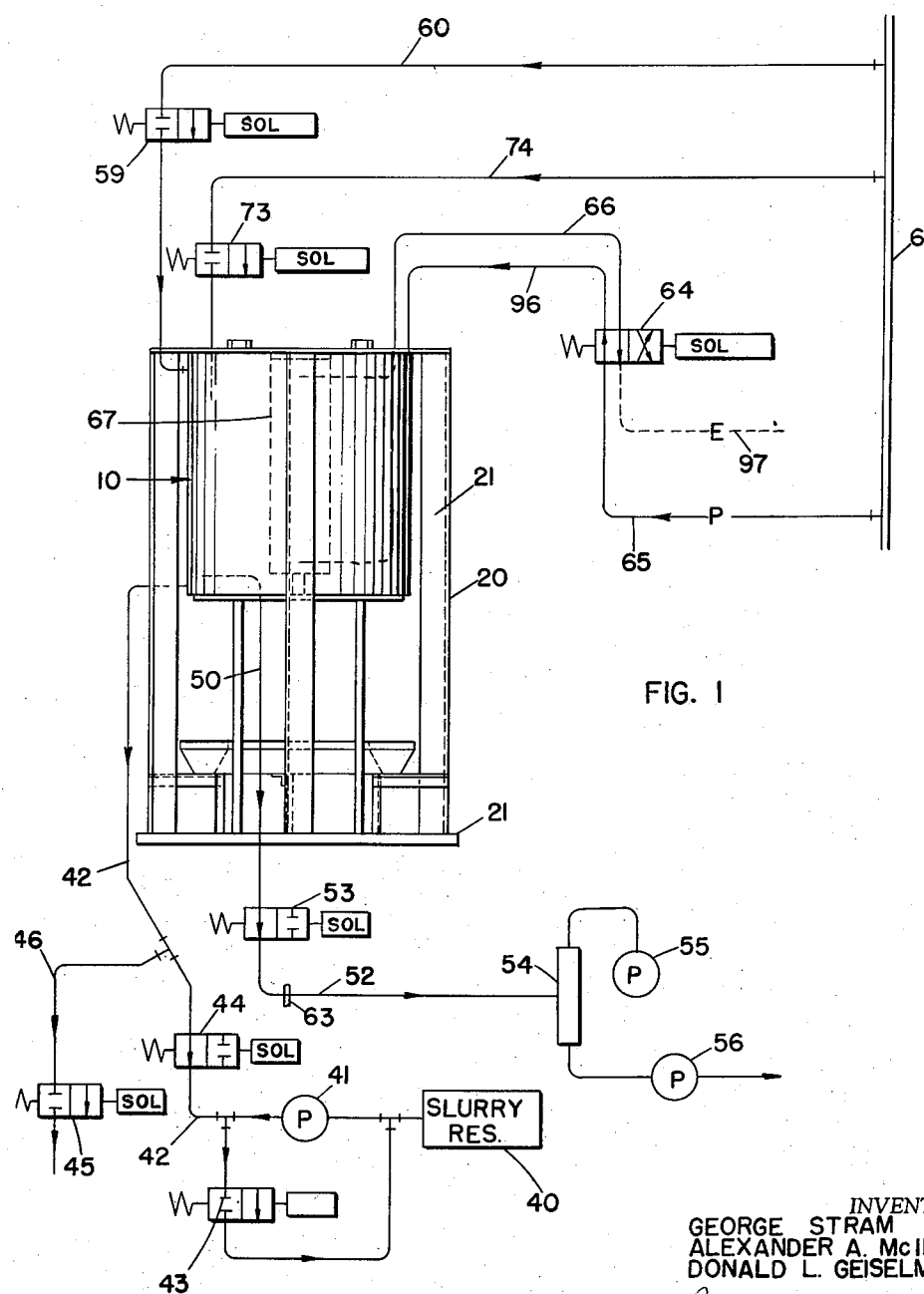
FIGURE 1 is a view in side elevation of the filter with the piping applied thereto and shown schematically.

In the drawings, referring to the form of the invention shown in FIGURES 1 to 6, inclusive, the reference numeral 10 indicates the filter receptacle and includes a stationary outer cylindrical open ended vertically disposed shell 11 and a concentric inner cylindrical open ended vertically disposed shell 12 arranged for axial vertical movement. The inner shell 12 is of lesser diameter than the outer shell 11 to form therebetween a slurry receiving annular chamber 13, when the filter receptacle is in closed position as shown in full lines in FIGURE 2.

Figure 2:
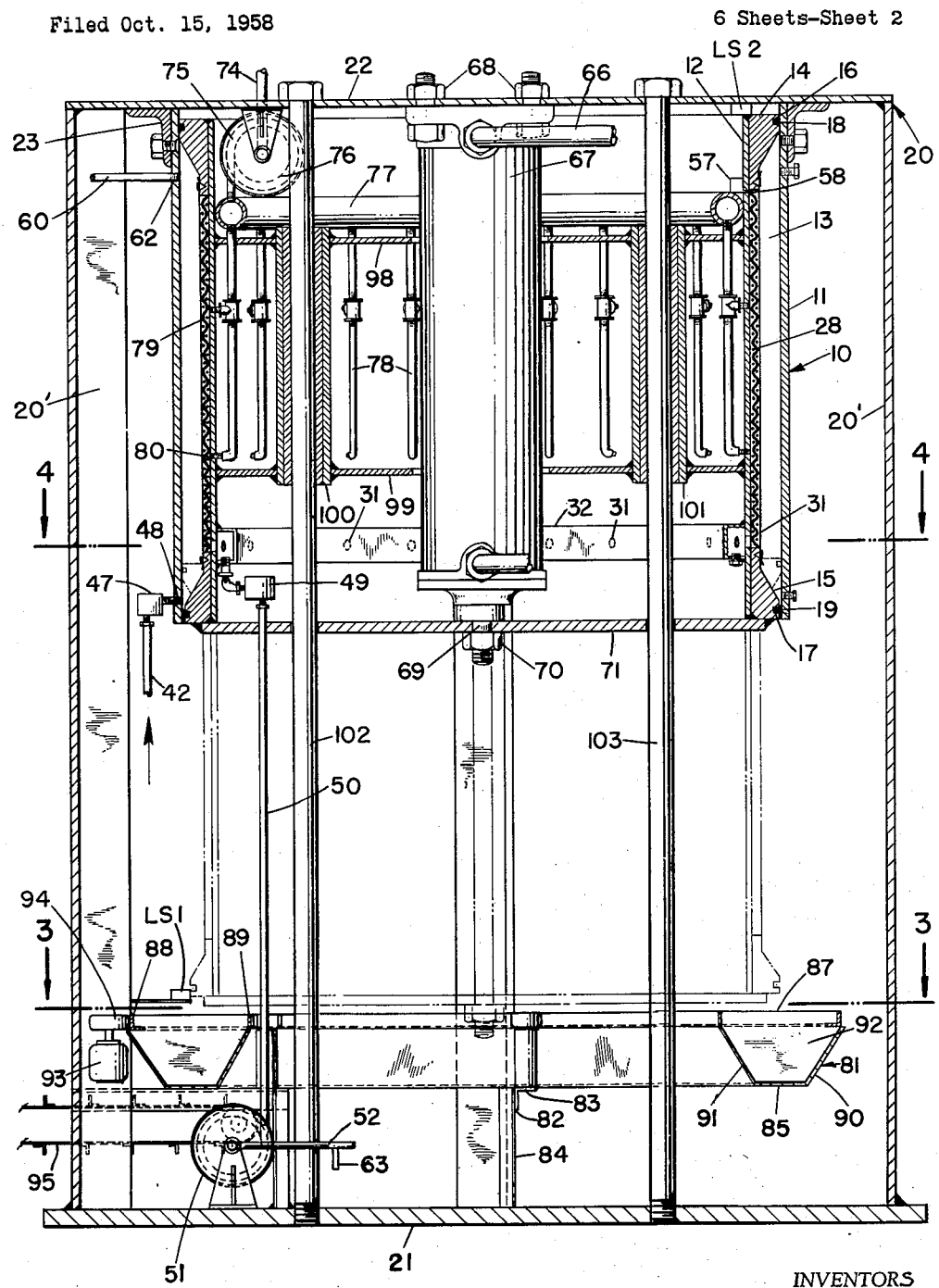
FIGURE 2 is a vertical sectional view through the filter apparatus, parts being shown in elevation.

In telescoped position of the shells 11 and 12, as shown in FIGURE 2, or what will hereinafter be referred to as the closed position of the filter receptacle 10, the ends of the slurry chamber 13 are closed by upper and lower annular heads 14 and 15. The annular heads 14 and 15 are respectively secured to the respective upper and lower end portions of the inner shell 12 in any suitable manner, as by welding. The outer peripheral surfaces of the heads 14 and 15 are provided with respective annular grooves 16 and 17 arranged to receive respective O-rings 18 and 19, formed of yieldable material. The cross sectional diameters of the O-rings 18 and 19 are slightly greater than the depth of the respective grooves 16 and 17 in which they are received, so that they are compressed by the internal surface of the end portions of the outer shell 11 to provide a pressure tight seal, preventing leakage of slurry from the chamber 13.

The outer shell 11 is rigidly supported by a frame 20 in spaced relation above a floor or base 21, to provide a space between the lower end of the shell 11 and the base 21′ to expose that portion of the inner shell 12 below its upper annular head 14, when the inner shell is moved vertically downward from the position shown in full lines to the position shown in phantom in FIGURE 2. The frame 20 includes a plurality of upright angle irons 20′ suitably secured at their lower ends to the floor or base 21, and disposed in surrounding spaced relation with respect to the outer shell 11. Transverse plate means 22 are suitably secured to and joint the upper ends of the angle irons 21, and brackets 23 or other suitable means rigidly secure the outer shell 11 to the plate means 22.

As best shown in FIGURES 2, 5 and 6, the outer surfaces of the annular heads 14 and 15 are formed with respective tapered surfaces 24 and 25, tapered in a direction toward each other and terminating in respective annular skirt portions 26 and 27. Surrounding and fitting closely against the peripheral surface of inner shell 12 between the skirt portions 26 and 27 of the heads 14 and 15, is a coarse wire mesh support 28 for the surrounding filter cloth 29, as shown in FIGURES 5 and 6. The coarse wire mesh support 28 provides a channeled annular passage or filtrate chamber 30, down which the filtrate, passing through the filter cloth 29, flows through a series of ports 31 in the lower end portion of the inner shell 12 into an annular filtrate manifold 32 secured, as by welding, to the inner surface of the inner shell 12.

The opposite ends of the filter cloth 29 are arranged to overlap annular, preferably V-shaped grooves 33 and 34 in the respective skirt portions 26 and 27 of respective heads 14 and 15. Rings 35 and 36 of a compressible material, fit in and wedge the filter cloth 29 in the respective grooves 33 and 34. The rings 35 and 36 extend outwardly beyond the grooves 33 and 34, and clamp rings 37 and 38 extending about the periphery of respective rings 35 and 36 when tightened compress and force the rings 35 and 36 tightly into the grooves 33 and 34 forming an effective seal against leakage of slurry from slurry chamber 13 into filtrate passage or chamber 30. If desired a fine mesh screen 39 may be disposed in surrounding engagement with the filter cloth 29 as shown in FIGURES 5 and 6.

Referring particularly to FIGURE 1, the slurry to be filtered is delivered under pressure from slurry reservoir 40 or other source of supply by pump 41 through slurry supply pipe line 42, fitting 47, port 48 in outer shell 11 and into the lower portion of slurry chamber 13. Because of the annular configuration of the slurry chamber 13 as defined by the upper and lower heads 14 and 15, and the inner and outer shells 12 and 11, with the shells 12 and 11 spaced a relatively small distance apart, a large filter medium area is provided with a slurry chamber of relatively small volume, so that the slurry chamber 13 can be filled in a comparatively short time, and equally important, as later explained, it can be drained in a comparatively short time.

While the operation of the apparatus may be manually controlled, it is of course preferable to automatically control the sequential operation of the various valves and the operation of the apparatus is hereinafter described with reference to the automatic control thereof. The automatic operation will be described in more detail later in connection with the schematic electrical diagram, FIGURE 7. It is suffice for the present, to say that upon initiation of the operation of the apparatus, the slurry pump 41 runs continuously, and at such time the by-pass solenoid operated valve 43 around the pump 41 is closed, the solenoid operated slurry valve 44 in the slurry supply pipe line 42 is open, and solenoid operated dump valve 45 in dump pipe line 46, which latter line communicates with line 42, is closed, whereby slurry is delivered under pressure into slurry chamber 13 and filtration begins.

The filtrate, as previously described, flows downwardly through the channeled passage 30 and through ports 31 into the filtrate manifold 32 from whence it passes through fitting 49 into a flexible hose 50, the lower end of which winds about a tension reel 51 and communicates with filtrate pipe line 52. A solenoid operated filtrate valve 53 in filtrate line 52 is open at this time. The filtrate line 52 preferably communicates with a vacuum filtrate receiving tank 54 connected to vacuum pump 55, which pump 55 is also preferably arranged to operate continuously along with slurry pump 41, upon initiating operation of the apparatus. A pump 56 may be provided for pumping the filtrate from tank 54 to any desired destination.

The filtering effect of the filter cloth 29 rapidly diminishes as the time interval from the beginning of the filtration period increases, so that a high rate of filtration at the beginning of the filtration period rapidly diminishes as solids accumulate on the filter cloth. Indeed, should pressure filtration be extended the filter cake often becomes compressed and hardened and blinds the pores of the filter cloth, so that after removal of the cake considerable time and effort are required to clean the filter cloth between operations, and in many instances the cloth may be rendered unfit for further use.

In the present apparatus, the optimum time for interrupting filtration is determined by a pressure sensing device 57 mounted on the inner wall of the inner shell 12, the probe 58 of which extends through the shell 12 into the filtrate passage 30 adjacent the upper end thereof, as best shown in FIGURE 5. Such pressure sensitive devices are well known in the art and the details of construction are consequently not shown. In operation, as filtration proceeds, the pressure in the filtrate passage 30 will drop off as compared to the pressure in the slurry chamber 13 due to the build up of the cake on the filter cloth and the impregnation of the filter cloth with solids. The pressure sensitive probe 58 is arranged to actuate the pressure sensitive device 57 when the pressure in the filtrate chamber has dropped to a predetermined point, this being a point at which liquid is still flowing through the filter cloth and prior to the characteristic sharp decline in rate of filtration.

The present apparatus is so constructed that it provides for location of the pressure sensitive probe in the filtrate passage 30 in close proximity to the filter cloth where undesired fluctuations, which result from a more remote location of the pressure sensitive probe, are eliminated and more precise control of the filtration cycle is provided. Actuation of the pressure sensing device 57 as hereinafter described in connection with the electrical diagram, effects (1) closing of the slurry valve 44 to interrupt delivery of slurry to slurry chamber 13; (2) opening of by-pass valve 43 so that the pump 41, which as prevously stated operates continuously, merely recirculates the slurry; (3) opens the dump valve 45 to permit the slurry in slurry chamber 13 to drain through pipe lines 42, 46.

Actuation of the pressure sensitive device 57, as will be hereinafter described in more detail in connection with the electrical diagram, also effects opening of normally closed solenoid operated valve 59, which is disposed in purge air line 60. Purge air line 60 leads from a main air line 61, as shown in FIGURE 1, which communicates with a suitable source of air under pressure, not shown. Purge air line 60 delivers air under pressure to the upper end of slurry chamber 13 through port 62 in outer shell 11, as best shown in FIGURE 2, which facilitates discharge of the slurry from the chamber 13.

As the slurry in chamber 13 drains, the filtrate in filtrate passage or chamber 30 also drains, and means is provided which upon completion of such drainage, effects movement of the inner shell 12 to its lowered position, or open position of the filter receptacle 10. This means is preferably in the form of a liquid level control device 63 of any well known type, shown disposed in the filtrate line 52, though if desired it may be disposed in the dump line 46, and which when the filtrate has drained functions to effect movement of solenoid operated control valve 64 to a position providing communication between pressure supply line 65 and line 66 leading to the upper end of an air cylinder and piston unit 67 and between exhaust line 97 and line 96 leading to the lower end of cylinder and piston unit 67.

The unit 67 is vertically disposed centrally within the space defined by the shell 12 in the closed position of the filter receptacle 10 and at its upper end is bolted as at 68, or otherwise rigidly secured, to the rigid transverse plate means 22. The piston rod 69 of the cylinder is rigidly bolted, as at 70, to a transverse plate 71 which extends diametrically across and is secured in suitable manner, as by welding, to the lower end of the vertically movable inner shell 12. Thus, when pressure fluid is introduced into the upper end of the cylinder and piston unit 67, the inner shell 12 together with the elements carried thereby is moved downwardly to the open position of the filter receptacle 10.

At the same time that the liquid level control device 63 functions to effect opening of the filter receptacle 10, it also functions to effect re-closing of the filtrate valve 53, the dump valve 45 and the purge air valve 59, all as set forth in more detail hereinafter in connection with the electrical diagram. A time delay means is initiated at the same time, as hereinafter brought out in the description of the electrical diagram, for retaining the filter receptacle in open position for a length of time sufficient for removal of the cake deposited on the filter cloth 29.

In the open position of the filter receptacle 10, the lower end of the inner shell 12 engages a limit switch, LS-1, arranged to open solenoid operated valve 73 in air line 74 for introducing air under pressure into the filtrate passage or chamber 30 for loosening the cake on the filter cloth 29. The air line 74 communicates with a flexible hose 75, which is wound around a tension reel 76. The flexible hose 75 is connected to an annular manifold 77 carried by the inner shell 12 and disposed adjacent the inner surface and near the upper end thereof. A series of equidistantly spaced, vertically extending pipes 78 communicate with and depend from the manifold 77 for delivering air under pressure to the filtrate passage or chamber 30 through a series of upper ports 79 and lower ports 80 in the inner shell 12. The number and disposition of the ports may be varied, to accomplish the purpose of introducing air under pressure into the chamber 30 over a well distributed area against the back of the filter cloth 29 and the cake deposited thereon, to effect a uniform and effective loosening of the cake from the filter cloth 29.

The loosened cake drops from the filter cloth 29 into an annular trough 81 which is disposed above the base 21 and immediately below the lower end of the inner shell 12 in the lowered position of the shell 12, as best shown in FIGURE 2. The annular trough 81 is supported on and secured in any suitable manner to brackets 82 formed by angle members 83 which are secured at one end to the frame angle irons 20' and extend radially inward therefrom in a horizontal plane. The angle members 83 project inwardly beyond the inner wall of the annular trough 81, and at their inner ends are rigidly supported by vertical angle members 84 of the brackets 82, the lower ends of the angle members 84 being rigidly secured, as by welding, to the base 21.

The bottom wall 85 of the trough 81 is provided with a cake discharge opening 86 to which the cake is conveyed by a sweep conveyor 87. The sweep conveyor 87 includes outer and inner concentric rings 88 and 89 respectively disposed immediately over the upper edges of respective outer and inner side walls 90 and 91 of the trough 81, and additionally includes a series of radially disposed equidistantly spaced paddles 92 fitting closely in the trough 81 and resting on the bottom wall 85 thereof. Provision is made for rotating the sweep conveyor 87 from a motor 93, herein shown as a friction drive including a rotatable disc 94 operated by motor 93 and frictionally engaging the outer ring 88 of the sweep conveyor 87. Any suitable type of belt conveyor, as shown at 95, having one end disposed beneath the cake discharge opening 86, may be employed for transporting the cake from the apparatus.

As previously explained, time delay means retains the filter receptacle in open position for a length of time sufficient for removal of the cake from the filter cloth 29. At the end of this time, the time delay means as described hereinafter in connection with the electrical diagram, permits the cylinder operating valve 64 to return to a position providing communication between the pressure supply 65 and line 96 leading to the lower end of cylinder and piston unit 67, and between exhaust line 97 and line 66 leading to the upper end of cylinder and piston unit 67, whereupon the shell 12 returns to its up position, or closed position of the filter receptacle.

As soon as the shell 12 leaves its lowered position, the limit switch LS-1 opens whereupon the valve 73 closes to cut off the flow of air into the filtrate passage or chamber 30. Upon reaching its closed position, the shell 12 engages a limit switch LS-2, and the cycle is repeated.

Provision is made for guiding the movement of the inner shell 12 between open and closed position of the filter receptacle 10, and includes upper and lower horizontal plate members 98 and 99 extending across and secured to the inner surface of the shell 12. Vertically extending sleeves 100 and 101 extend through and are secured to the upper and lower plate members 98 and 99. Guide rods 102 and 103 extend vertically between the top plate 22 and the base 21 of the frame 20 through the sleeves 100 and 101, whereby the inner shell 12 is guided in its upward and downward movement.

Figure 7:
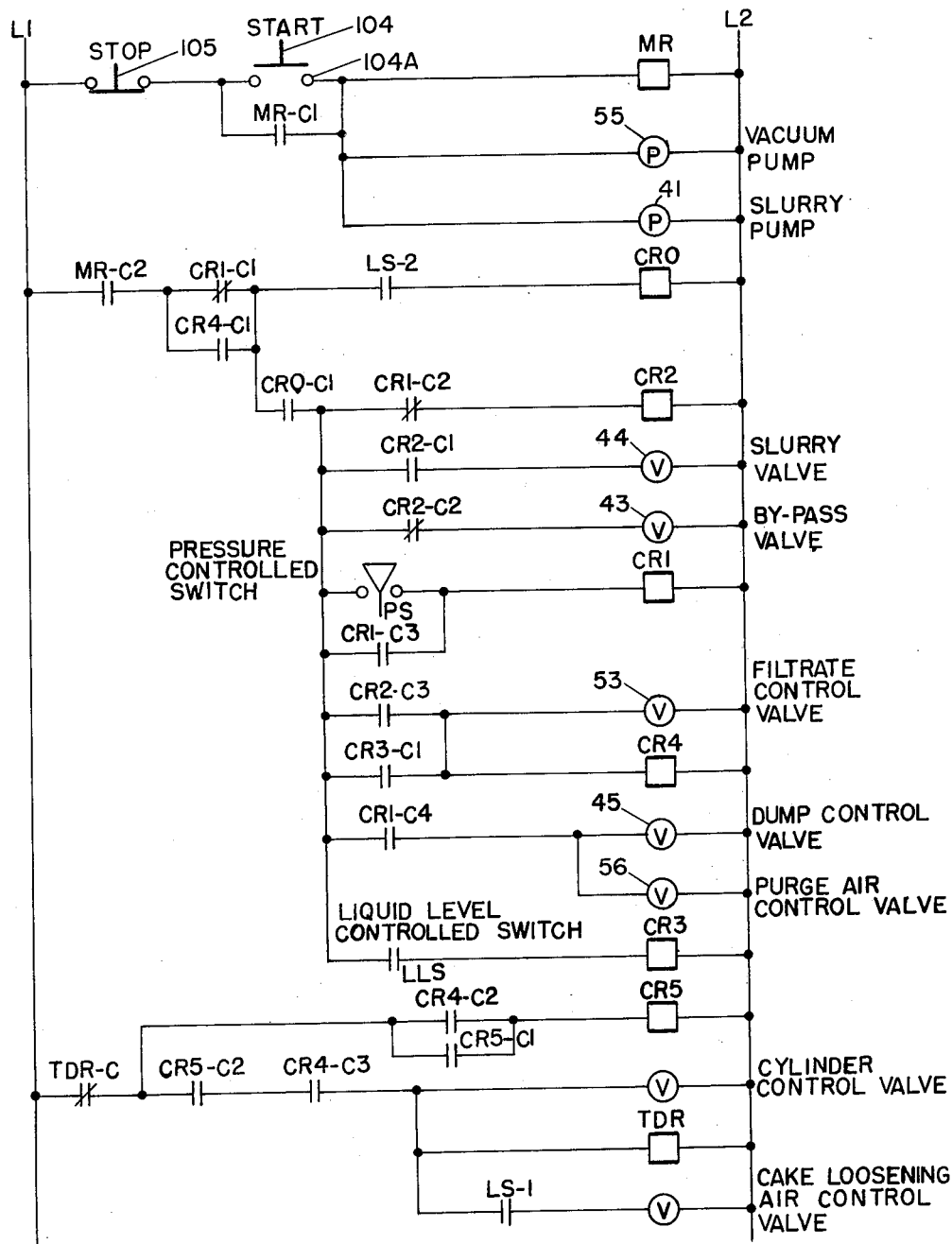
FIGURE 7 is a schematic diagram of an electrical circuit for the apparatus.

In operation, referring more particularly to FIGURE 1 and the electrical diagram, FIGURE 7, by pressing start push button 104, closing contact 104A, circuits are completed for initiating operation of vacuum pump 55 and slurry pump 41. Master relay MR is energized and a normally open contact MR–C1 of relay MR is closed to provide a holding circuit for effecting continuous operation of vacuum pump and slurry pump 41 upon release of start push button 104, and such operation will continue until stop push button 105 is pressed.

At the same time, a normally open contact MR–C2 of relay MR closes, whereby a circuit is completed to control relay CR0 through MR–C2, a normally closed contact CR1–C1 of control relay CR1, and limit switch LS–2. Control relay CR0 is thus energized and its normally open contact CR0–C1 is closed whereby a circuit is completed to control relay CR2 through now closed contact MR–C2, normally closed contact CR1–C1, now closed contact CR0–C1 and a normally closed contact CR1–C2 of control relay CR1. Energization of control relay CR2 closes contact CR2–C1 completing a circuit whereby to open normally closed solenoid operated slurry valve 44; opens contact CR2–C2 to break a circuit whereby to close normally open solenoid operated bypass valve 43; and closes contact CR2–C3 completing a circuit whereby to open normally closed solenoid operated filtrate valve 53. The filtering cycle is thereby initiated, slurry being pumped under pressure by pump 41 through valve 44 and line 42 to the slurry chamber 13, and filtrate being withdrawn by vacuum pump 55 from the channeled passage or filtrate chamber 30 through lines 50, 52 and valve 53 to the vacuum receiving tank 54. Closing of contact CR2–C3 also completes a circuit to energize control relay CR4.

The flow of filtrate through lines 50, 52 passes over liquid level control device 63 which is arranged to close a switch LLS, thereby closing a circuit to energize control relay CR3. Energization of control relay CR3 closes its normally open contact CR3–C1 which completes a circuit to solenoid operated filtrate valve 53, holding the latter open, and also completes a circuit to hold control relay CR4 energized.

Energization of control relay CR4 closes its normally open contact CR4–C1, which now parallels contact CR1–C1. Energization of control relay CR4 also closes normally open contact CR4–C2 and open normally closed contact CR4–C3, which prepares a circuit for certain operations subsequent to the filtering cycle, which will be adverted to later.

The filtering cycle continues until the pressure in filtrate passage 30 drops to a predetermined value, indicating the end of the desired filtering cycle, as previously explained. At such time, the pressure sensing device 57 closes pressure controlled switch PS completing a circuit to energize control relay CR1. Energization of control relay CR1 closes normally open contact CR1–C3 providing a holding circuit to maintain control relay CR1 energized upon re-opening of pressure switch PS. Energization of control relay CR1 also opens normally closed contact CR1–C1, but the circuit maintaining control relay CR0 energized is maintained through parallel contact CR4–C1.

Energization of control relay CR1 also opens normally closed contact CR1–C2, thereby breaking the circuit to de-energize control relay CR2, whereupon contact CR2–C1 opens and CR2–C2 closes to thereby effect re-closing of slurry valve 44 and re-opening of by-pass valve 43. Flow of slurry to slurry chamber 13 is thus interrupted and the pump 41, which operates continuously, merely re-circulates the slurry through now open by-pass valve 43. De-energization of control relay CR2 effects re-opening of contact CR2–C3; however, the solenoid operated filtrate valve 53 remains open and control relay CR4 remains energized since closed contact CR3–C1 holds the circuits to the solenoid operated filtrate valve 53 and the control relay CR4.

Energization of control relay CR1 also closes normally open contact CR1–C4 completing a circuit to solenoid operated normally closed dump valve 45 to open the latter, and also completing a circuit to solenoid operated normally closed purge air valve 59 to open the latter. The slurry in slurry chamber 13, when the filtering cycle has been completed, now drains from chamber 13 through port 48 into the proximate portion of line 42 and then through dump line 46 and dump valve 45 to dump, or if desired, back to slurry reservoir 40. As previously described, opening of purge air valve 59 permits air under pressure to enter the upper end of slurry chamber 13 and accelerates draining of the chamber.

When the filtrate in the filtrate passage or chamber 30 has drained and has cleared the liquid level control 63, and at such time the slurry has also drained from the slurry chamber 13, the liquid level controlled switch LLS re-opens and control relay CR3 is de-energized. This marks the end of the filtering cycle.

Contact CR2–C3 is open at this time, and de-energization of control relay CR3 now opens contact CR3–C1 whereupon the circuit to solenoid operated filtrate valve 53 is broken and the filtrate valve 53 re-closes. Opening of contact CR3–C1 also breaks the circuit to control relay CR4.

De-energization of control relay CR4 re-opens contact CR4–C1 breaking the circuit to and de-energizing control relay CR0 and also breaking the circuit to and de-energizing control relay CR1. De-energization of control relay CR1 re-opens contact CR1–C4 whereupon dump valve 45 is re-closed and purge air valve 59 is re-closed.

The circuit which was previously prepared, as mentioned above, now takes over. This circuit was prepared by energization of control relay CR4, at which time normally open contact CR4–C2 closed, completing a circuit through normally closed contact TDR–C1 of time delay relay TDR to energize control relay CR5. Energization of control relay CR5, at that time closed contact CR5–C1 to provide a holding circuit and also closed normally open contact CR5–C2. When now, control relay CR4 is de-energized, at the end of the filtering cycle, as explained above, contact CR4–C2 re-opens, but control relay CR5 is held energized by hold contact CR5–C1, and contact CR4–C3 is re-closed.

A circuit is thereupon completed to effect movement of solenoid operated cylinder control valve 64 from its normal position to a position providing communication between pressure supply line 65 and line 66 leading to the upper end of cylinder and piston unit 67, and between exhaust line 97 and line 96 leading to the lower end of the cylinder of the unit 67 whereby the inner shell 12 is moved downwardly to the position shown in phantom in FIGURE 2, or what has been referred to above as the open position of the filter receptacle 10. When the inner shell 12 reaches its lowered position, it engages limit switch LS–1, completing a circuit to the cake loosening air control valve 73, whereupon air under pressure is introduced into the filtrate passage or chamber 30, as previously explained, to loosen the cake from the filter cloth 29 and permit it to drop into the collecting trough 81.

At the same time that the circuit to the solenoid operated cylinder control valve 64 is completed, a circuit is also completed to time delay relay TDR arranged after a predetermined time sufficient to permit the filter receptacle 10 to open and the cake to be removed, to open normally closed time delay relay contact TDR–C. Thereupon the circuit to solenoid operated cylinder control valve 64 is broken, permitting the valve 64 to return to a position providing communication between the pressure supply line 65 and line 96 leading to the lower end of the cylinder of unit 67, and between exhaust line 97 and line 66 leading to the upper end of the cylinder, whereby the inner shell 12 is moved upward to its full line or closed position. As soon as shell 12 moves upward, limit switch LS–1 opens and the cake loosening air control valve 73 closes to cut off the flow of air under pressure to the filtrate passage or chamber 30.

When contact TDR–C opens, control relay CR5 is de-energized, permitting contact CR5–C2 to re-open, also time control relay TDR is de-energized permitting contact TDR–C to re-close. When the inner shell 12 reaches its full line or closed position, it engages limit switch LS–2 completing the circuit to control relay CR0, and the next filtering cycle begins.

A specific electrical system has been described above for controlling the sequence of events, but it is to be understood that such sequence of events can be controlled by modifications of the described system without departing from the scope of the invention.

While the operation of the apparatus has been particularly described relative to a filtering operation wherein it is desired to save the cake, it is obvious that it may also be employed to advantage in carrying out filtering operations wherein the primary purpose is to clarify a liquid containing suspended particles without recovery of the separated solids. In such case the operation of the apparatus is modified to eliminate the step of exposing the filter assembly after each filtering cycle, but the solids retained on the filter cloth are removed by backwashing in well known manner and permitting the wash liquid and removed solids to flow to dump.

The apparatus has been particularly described in connection with the method of carrying out the filtration in short cycles as determined by a pressure or pressure differential sensing device, but it is apparent that it may be carried out on a time cycle by any well known timing device, particularly where the characteristics of the material to be filtered are known or are determined by preliminary tests.

Figure 8:
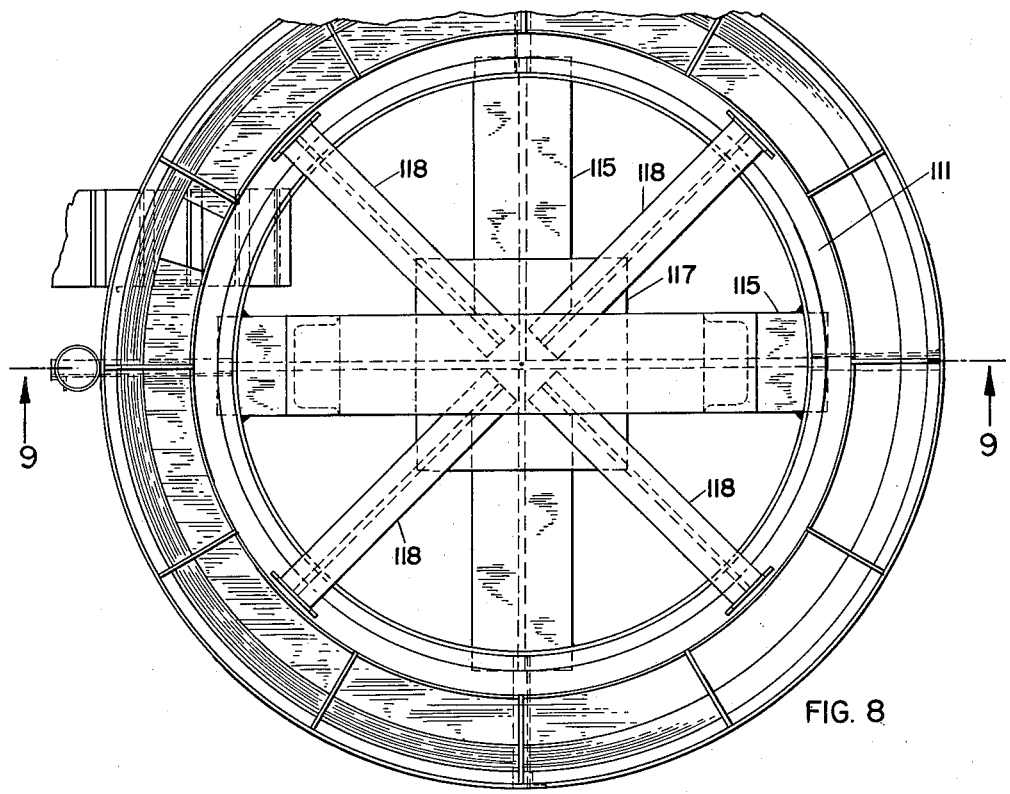
FIGURE 8 is a top plan view of a modified form of the invention.
Figure 10:
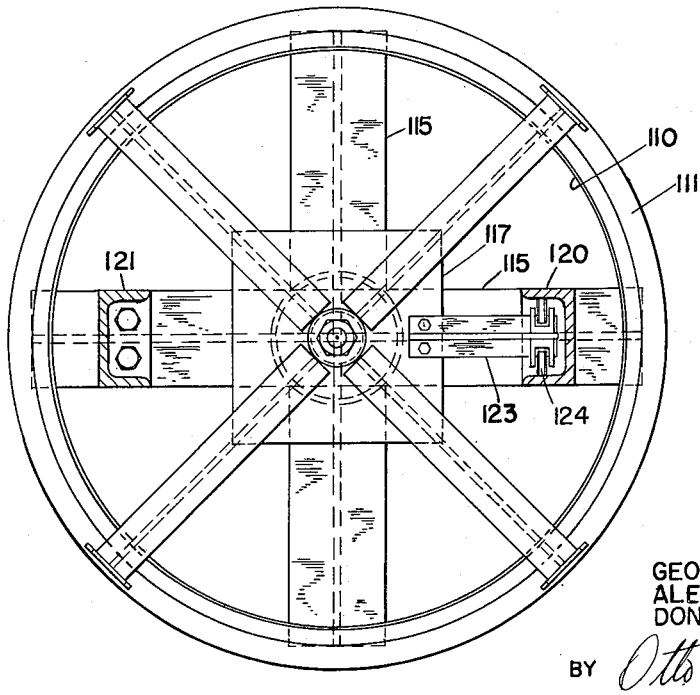
FIGURE 10 is a sectional view taken on line 10—10 of FIGURE 9.
Figure 9:
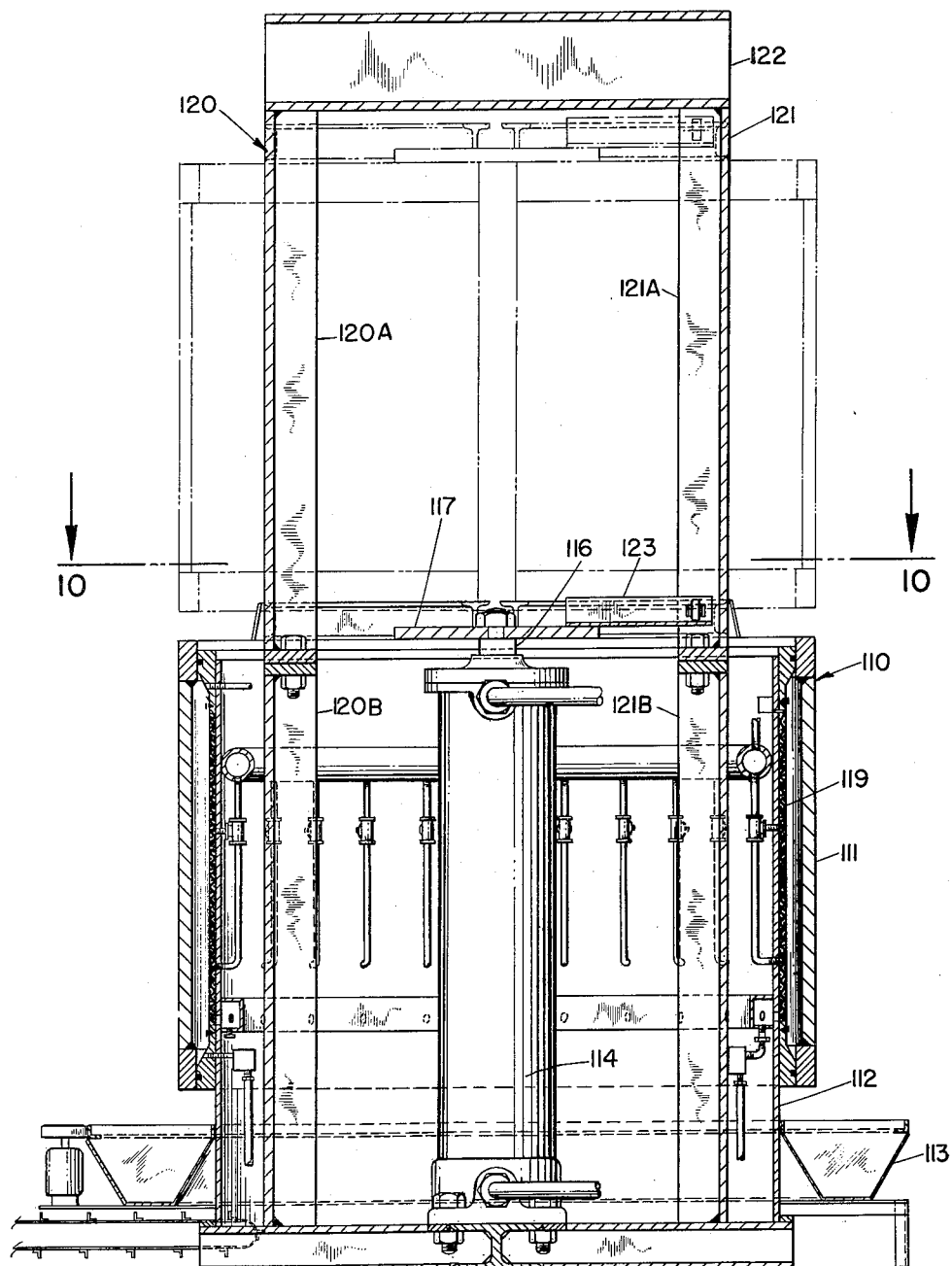
FIGURE 9 is a vertical sectional view through the modified form of the filter apparatus on the line 9—9 of FIGURE 8, parts being shown in elevation.

In FIGURES 8, 9 and 10 is shown a modified form of the invention wherein the filter receptacle 110 including the outer shell 111 and the inner shell 112 are disposed immediately above the cake collecting trough 113, and the outer shell 111 is movable upwardly to the position shown in phantom in FIGURE 9, which is the open position of the filter receptacle 110. The details of construction of the filter receptacle 110 are generally the same as the filter receptacle 10 of the first form of the invention and therefore need not be particularly described.

The cylinder and piston unit 114 for moving the outer shell 111 is disposed within the inner shell 112 and is rigidly mounted on a suitable base 115. The end of the piston rod 116 protruding from the upper end of the cylinder and piston unit 114 has rigidly secured thereto a plate 117 which in turn is rigidly connected with the top peripheral edge of the outer shell 111 by means of a plurality of radially extending beams 118. The cylinder and piston unit 114, through the described connecting means, is thus adapted to move the outer shell 111 between the full line position and the position shown in phantom in FIGURE 9. When the outer shell is raised to its upper position, the cake which has collected on the filter medium 119 is loosened in the same manner as described in the first form of the invention and is collected in the trough 113. The trough construction and its operation is the same as in the first form of the invention and the description thereof need therefore not be repeated.

Provision is made for guiding the shell 111 in its movement between open and closed position of the filter receptacle 110. This includes a suitable frame, preferably in the form of a pair of upright supports 120, 121, each including a pair of end to end rigidly connected upper and lower channel beams, 120a and 120b, and 121a and 121b, with the lower ends of the supports 120 and 121 secured, as by welding, to the base 115, and the upper ends being rigidly connected by an I beam 122 welded or otherwise secured thereto. Rigidly secured to the plate 117 and projecting laterally therefrom is a T beam 123, the free end of which extends into the channel of the upright channel beam 121a of the support 121. Mounted in any suitable manner, on the free end of the T beam 123, are a pair of rollers 124 which are arranged to engage the inner surfaces of the sides of the channel beam 121a.

The operational steps described in connection with the first form of the invention are carried out in similar manner in the modified form of the apparatus, and it is therefore considered unnecessary to repeat it.

We claim:

1. In a pressure filter, inner and outer cylindrical coaxial vertical shells normally disposed one within the other in radial spaced relation to form an annular chamber therebetween, annular end closures for said annular chamber fixedly carried by opposite ends of said inner shell and disposed in sealing engagement with the opposite ends of said outer shell, a cylindrical filter medium fixedly carried by said inner shell and disposed in close proximity to said inner shell between the cylindrical surfaces of said inner and outer shells dividing said annular chamber into annular slurry and filtrate receiving zones, inlet means for supplying slurry to said annular slurry receiving zone, an annular manifold within and carried by said inner shell adjacent the lower end of said filtrate zone, a plurality of circumferentially spaced ports in said inner shell providing communication between the lower end of said filtrate zone and said manifold for flow of filtrate from said filtrate zone to said manifold during filtering operations, and connections for carrying filtrate from said manifold.

2. In a pressure filter, inner and outer cylindrical coaxial vertical shells normally disposed one within the other in radial spaced relation to form an annular chamber therebetween, annular end closures for said annular chamber fixedly carried by opposite ends of said inner shell and disposed in sealing engagement with the opposite ends of said outer shell, a cylindrical filter medium fixedly carried by said inner shell and disposed in close proximity to said inner shell between the cylindrical surfaces of said inner and outer shells dividing said annular chamber into annular slurry and filtrate receiving zones, inlet means for supplying slurry to said annular slurry receiving zone, an annular manifold within and carried by said inner shell adjacent the lower end of said filtrate zone, a plurality of circumferentially spaced ports in said inner shell providing communication between the lower end of said filtrate zone and said manifold for flow of filtrate from said filtrate zone to said manifold during filtering operations, means stationarily mounting one of said shells and means guidingly supporting the other of said shells for unobstructed axial movement between said normal chamber forming position and a position for exposing said filter medium, and actuating means operatively connected with said movable shell for moving the same.

3. In a pressure filter, inner and outer cylindrical coaxial vertical shells normally disposed one within the other in radial spaced relation to form an annular chamber therebetween, annular end closures for said annular chamber fixedly carried by opposite ends of said inner shell and disposed in sealing engagement with the opposite ends of said outer shell, a cylindrical filter medium fixedly carried by said inner shell and disposed in close proximity to said inner shell between the cylindrical surfaces of said inner and outer shells dividing said annular chamber into annular slurry and filtrate receiving zones, inlet means for supplying slurry to said annular slurry receiving zone and outlet means for discharging filtrate from said annular filtrate receiving zone, an annular manifold within and carried by said inner shell for receiving fluid under pressure, a plurality of ports in said inner shell distributed throughout the surface thereof, and connections between said manifold and all of said ports for introducing fluid under pressure simultaneously through all of said ports into said filtrate zone to loosen the cake formed on said filter medium as a result of a filtering operation.

4. In a pressure filter, inner and outer cylindrical coaxial vertical shells normally disposed one within the other in radial spaced relation to form an annular chamber therebetween, annular end closures for said annular chamber fixedly carried by opposite ends of said inner shell and disposed in sealing engagement with the opposite ends of said outer shell, a cylindrical filter medium fixedly carried by said inner shell and disposed in close proximity to said inner shell between the cylindrical surfaces of said inner and outer shells dividing said annular chamber into annular slurry and filtrate receiving zones, inlet means for supplying slurry to said annular slurry receiving zone and outlet means for discharging filtrate from said annular filtrate receiving zone, an annular manifold within and carried by said inner shell for receiving fluid under pressure, a plurality of ports in said inner shell distributed throughout the surface thereof, connections between said manifold and all of said ports for introducing fluid under pressure simultaneously through all of said ports into said filtrate zone to loosen the cake formed on said filter medium as a result of a filtering operation, means stationarily mounting one of said shells, means guidingly supporting the other of said shells for unobstructed axial movement between said normal chamber forming position and a position to expose said filter medium for removal of the cake, and actuating means operatively connected with said movable shell for moving the same.

5. In a pressure filter, inner and outer cylindrical coaxial vertical shells normally disposed one within the other in radial spaced relation to form an annular chamber therebetween, annular end closures for said annular chamber fixedly carried by opposite ends of said inner shell and disposed in sealing engagement with the opposite ends of said outer shell, each of said end closures having an annular skirt projecting into said annular chamber circumjacent said inner shell and spaced from said outer shell, an annular groove in the outer face of each of said skirts, a pliable filter medium surrounding said inner shell and overlapping the annular grooves in said skirts to divide said chamber into annular slurry and filtrate receiving zones, inlet means for supplying slurry to said annular slurry receiving zone and outlet means for discharging filtrate from said annular filtrate receiving zone, and a compressible ring engageable in each of said annular grooves over said filter medium for clamping said filter medium in sealing engagement with said skirt.

6. In a pressure filter, inner and outer cylindrical co-axial vertical shells normally disposed one within the other in radial spaced relation to form an annular chamber therebetween, annular end closures for said annular chamber fixedly carried by opposite ends of said inner shell and disposed in sealing engagement with the opposite ends of said outer shell, each of said end closures having an annular skirt projecting into said annular chamber circumjacent said inner shell and spaced from said outer shell, an annular groove in the outer face of each of said skirts, a pliable filter medium surrounding said inner shell and overlapping the annular grooves in said skirts to divide said chamber into annular slurry and filtrate receiving zones, inlet means for supplying slurry to said annular slurry receiving zone and outlet means for discharging filtrate from said annular filtrate receiving zone, a compressible ring engageable in each of said annular grooves over said filter medium for clamping said filter medium in sealing engagement with said skirt, and channeled support means in surrounding direct contact with said inner shell between said skirt members for supporting said filter medium in spaced relation with respect to said inner shell.

7. In a pressure filter, inner and outer cylindrical co-axial vertical shells normally disposed one within the other in radial spaced relation to form an annular chamber therebetween, annular end closures for said annular chamber fixedly carried by opposite ends of one of said shells and disposed in sealing engagement with the opposite ends of the other of said shells for sealing said chamber during filtering operations, a cylindrical filter medium carried by one of said shells dividing said chamber into annular slurry and filtrate receiving zones, inlet means for supplying slurry to said annular slurry receiving zone and outlet means for discharging filtrate from said annular filtrate receiving zone, means stationarily mounting one of said shells, means guidingly supporting the other of said shells for unobstructed axial movement between said normal chamber forming position and a position for exposing the cake collecting side of said filter medium, and an annular trough disposed in close proximity to the periperal lower edge of said annular filter medium in its exposed position to receive the cake deposited on said filter medium during a filtering operation.

8. In a pressure filter, inner and outer cylindrical co-axial vertical shells normally disposed one within the other in radial spaced relation to form an annular chamber therebetween, annular end closures for said annular chamber fixedly carried by opposite ends of one of said shells and disposed in sealing engagement with the opposite ends of the other of said shells for sealing said chamber during filtering operations, cylindrical filter medium carried by one of said shells dividing said chamber into annular slurry and filtrate receiving zones, inlet means for supplying slurry to said annular slurry receiving zone and outlet means for discharging filtrate from said annular filtrate receiving zone, means stationarily mounting one of said shells, means guidingly supporting the other of said shells for unobstructed axial movement between said normal chamber forming position and a position for exposing the cake collecting side of said filter medium, an annular trough disposed in close proximity to the peripheral lower edge of said annular filter medium in its exposed position to receive the cake deposited on said filter medium during a filtering operation, and conveying means in said annular trough for conveying the cake to a discharge point.

9. In a pressure filter, inner and outer cylindrical co-axial vertical shells normally disposed one within the other in radial spaced relation to form an annular chamber therebetween, annular end closures for said annular chamber fixedly carried by opposite ends of one of said shells and disposed in sealing engagement with the opposite ends of the other of said shells for sealing said chamber during filtering operations, cylindrical filter medium carried by one of said shells dividing said annular chamber into annular slurry and filtrate receiving zones, inlet means for supplying slurry to said annular slurry receiving zone and outlet means for discharging filtrate from said annular filtrate receiving zone, actuating means disposed within the peripheral envelope of said inner shell for moving one of said shells vertically with respect to the other of said shells between a first position enclosing said filter medium and a second position exposing said filter medium, means stationarily mounting one of said shells, rigid vertical guide columns disposed within the peripheral envelope of said inner shell, and means fixed to said movable shell and engaging said guide columns for guiding said movable shell in an unobstructed axial path of movement between said first and second positions.

10. In a pressure filter, inner and outer cylindrical co-axial vertical shells normally disposed one within the other in radial spaced relation to form an annular chamber therebetween, annular end closures for said annular chamber fixedly carried by opposite ends of one of said shells and disposed in sealing engagement with the opposite ends of the other of said shells for sealing said chamber during filtering operations, a cylindrical filter medium carried by said inner shell between said end closures dividing said annular chamber into annular slurry and filtrate receiving zones, inlet means for supplying slurry to said annular slurry receiving zone and outlet means for discharging filtrate from said annular filtrate receiving zone, one of said shells being axially movable with respect to the other of said shells to expose said filter medium for removal of the cake, a plurality of ports distributed over the peripheral surface of said inner shell, connecting means between said ports and a source of air under pressure for introducing air under pressure behind said filter medium to loosen said cake, a control valve in said connecting means, and means responsive to movement of said movable shell to a position exposing said filter medium for opening said control valve and to movement of said movable shell from said last named position for closing said valve.

11. In a pressure filter, inner and outer cylindrical co-axial shells normally disposed one within the other in radial spaced relation to form an annular chamber therebetween, annular end closures for said annular chamber fixedly carried by opposite ends of one of said shells and disposed in relatively movable sealing engagement with the opposite ends of the other of said shells, a cylindrical filter medium fiexedly carried by one of said shells and disposed between the cylindrical surfaces of said inner and outer shells dividing said annular chamber into radially offset annular slurry and filtrate receiving zones, inlet means for supplying slurry to said annular slurry receiving zone and outlet means for discharging filtrate from said annular filtrate receiving zone, means stationarily mounting one of said shells, means guidingly supporting the other of said shells for unobstructed axial movement relative to said stationarily mounted shell between said normal chamber forming position and a position for exposing the cake collecting side of said filter medium, and means for moving said movable shell.

12. In a pressure filter, inner and outer cylindrical co-axial shells normally disposed one within the other in radial spaced relation to form an annular chamber therebetween, annular end closures for said annular chamber fixedly carried by opposite ends of one of said shells and disposed in relatively movable sealing engagement with the opposite ends of the other of said shells, a cylindrical filter medium fixedly carried by one of said shells and disposed between the cylindrical surfaces of said inner and outer shells dividing said annular chamber into radially offset annular slurry and filtrate receiving zones, inlet means for supplying slurry to said annular slurry receiving zone and outlet means for discharging filtrate from said annular filtrate receiving zone, means stationarily mounting one of said shells, means guidingly supporting the other of said shells for unobstructed axial movement relative to said stationarily mounted shell between said normal chamber forming position and a position for exposing the cake collecting side of said filter medium, and reciprocatable power means disposed within the peripheral envelope of said inner shell operatively connected with said movable shell for moving it between said positions.

13. In a pressure filter, inner and outer upright cylindrical coaxial shells normally disposed one within the other in radial spaced relation to form an annular chamber therebetween, annular end closures for said annular chamber fixedly carried by the opposite peripheral ends of said inner shell and disposed in relatively movable sealing engagement with the opposite ends of said outer shell, a cylindrical filter medium fixedly carried by said inner shell and disposed between the cylindrical surfaces of said inner and outer shells dividing said annular chamber into an annular outer slurry receiving zone and an annular inner filtrate receiving zone, inlet means for supplying slurry to said annular slurry receiving zone and outlet means for discharging filtrate from said annular filtrate receiving zone, means statoinarily mounting said outer shell in an elevated position, means guidingly supporting said inner shell for unobstructed axial movement relative to said outer shell between an upper position wherein it forms the said annular chamber with said outer shell and a lower position wherein it exposes the cake collecting side of said filter medium, and means for moving said inner shell between said upper and lower positions.

14. In a pressure filter, inner and outer upright cylindrical coaxial shells normally disposed one within the other in radial spaced relation to form an annular chamber therebetween, annular end closures for said annular chamber fixedly carried by the opposite peripheral ends of said inner shell and disposed in relatively movable sealing engagement with the opposite ends of said outer shell, a cylindrical filter medium fixedly carried by said inner shell and disposed between the cylindrical surfaces of said inner and outer shells dividing said annular chamber into an annular outer slurry receiving zone and an annular inner filtrate receiving zone, inlet means for supplying slurry to said annular slurry receiving zone and outlet means for discharging filtrate from said annular filtrate receiving zone, means stationarily mounting said inner shell, means guidingly supporting said outer shell for unobstructed axial movement relative to said inner shell between a lower position wherein it forms the said annular chamber with said inner shell and an upper position wherein it exposes the cake collecting side of said filter medium, and means for moving said outer shell between said lower and upper positions.

15. In a pressure filter, inner and outer cylindrical coaxial shells normally disposed one within the other in radial spaced relation to form an annular chamber therebetween, annular end closures for said annular chamber fixedly carried by and extending around opposite peripheral end portions of said inner shell, a peripheral groove in the outer end of each of said end closures, an O-ring of compressible material in each of said grooves in compressional relatively movable sealing engagement with the opposite ends of the cylindrical wall of said outer shell for sealing said annular chamber during filtering operations, a cylindrical filter medium fixedly carried by said inner shell and disposed between the cylindrical walls of said inner and outer shells dividing said annular chamber into annular slurry and filtrate receiving zones, inlet means for supplying slurry to said annular slurry receiving zone and outlet means for discharging filtrate from said annular filtrate receiving zone, means stationarily mounting one of said shells and means guidingly supporting the other of said shells for unobstructed axial movement relative to said stationarily mounted shell between said normal chamber forming position and a position for exposing the cake collecting side of said filter medium.

References Cited in the file of this patent
UNITED STATES PATENTS

| | | |
|---|---|---|
| 1,710,758 | Wright | Apr. 30, 1929 |
| 1,750,997 | Feldmeier | Mar. 18, 1930 |
| 2,189,458 | Carrier et al. | Feb. 6, 1940 |
| 2,478,976 | Modlin | Aug. 16, 1949 |
| 2,713,022 | Dole et al. | July 12, 1955 |
| 2,782,932 | Darnell | Feb. 26, 1957 |
| 2,843,267 | Anderson | July 15, 1958 |
| 2,867,324 | Hirs | Jan. 6, 1959 |
| 2,867,325 | Hirs | Jan. 6, 1959 |
| 2,878,942 | Whitmore | Mar. 24, 1959 |